(12) United States Patent
Kovach et al.

(10) Patent No.: US 6,761,120 B2
(45) Date of Patent: Jul. 13, 2004

(54) ROW CLEANER IN COMBINATION OF PRIMARY TILLAGE SHANK SYSTEM

(75) Inventors: Michael G. Kovach, Morton, IL (US); Rickey L. Gerber, Roanoke, IL (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/340,138

(22) Filed: Jan. 10, 2003

(65) Prior Publication Data

US 2003/0141087 A1 Jul. 31, 2003

Related U.S. Application Data

(60) Provisional application No. 60/352,304, filed on Jan. 27, 2002.

(51) Int. Cl.[7] ............................................... A01B 39/22
(52) U.S. Cl. ...................... 111/140; 172/146; 172/152
(58) Field of Search ................................. 111/140, 142, 111/52; 172/144, 145, 149, 151, 152, 146

(56) References Cited

U.S. PATENT DOCUMENTS

| | | | | |
|---|---|---|---|---|
| 3,692,120 A | * | 9/1972 | Cline .......................... | 172/151 |
| 4,187,916 A | * | 2/1980 | Harden et al. ............... | 172/146 |
| 4,245,706 A | | 1/1981 | Dietrich, Sr. ................ | 172/180 |
| 4,267,783 A | * | 5/1981 | Hendrix et al. ............. | 111/148 |
| 4,403,662 A | | 9/1983 | Dietrich, Sr. ................ | 172/156 |
| 4,461,355 A | * | 7/1984 | Peterson et al. ............. | 172/156 |
| 4,538,689 A | | 9/1985 | Dietrich, Sr. ................ | 172/700 |
| 4,574,715 A | * | 3/1986 | Dietrich, Sr. et al. ........ | 111/123 |
| 4,762,181 A | * | 8/1988 | Cox .............................. | 172/196 |
| 5,080,178 A | * | 1/1992 | Dietrich, Sr. ................ | 172/153 |
| 5,590,721 A | * | 1/1997 | Van Mill ...................... | 172/138 |
| 6,068,061 A | * | 5/2000 | Smith et al. ................. | 172/139 |
| 6,098,722 A | * | 8/2000 | Richard ........................ | 172/763 |
| 6,276,462 B1 | * | 8/2001 | Dietrich, Sr. ................ | 172/138 |
| 6,612,381 B2 | * | 9/2003 | Powell et al. ................ | 172/586 |
| 6,626,246 B2 | * | 9/2003 | Gerber et al. ................ | 172/142 |
| 2002/0144827 A1 | * | 10/2002 | Dietrich et al. .............. | 172/142 |
| 2003/0037935 A1 | * | 2/2003 | Sauder ......................... | 172/151 |
| 2003/0178209 A1 | * | 9/2003 | Knobloch et al. ........... | 172/145 |

* cited by examiner

*Primary Examiner*—Thomas B. Will
*Assistant Examiner*—Alexandra Pechhold
(74) *Attorney, Agent, or Firm*—Rebecca Henkal; Brant T. Maurer

(57) ABSTRACT

An agricultural primary tillage implement is disclosed with a row cleaner assembly attached in front of the shank. That row cleaner is adjustable fore-and-aft for optimum clearance between the shank and a leading soil preparation apparatus to maximize clearance for residue movement. The row cleaner is also adjustable for depth. The row cleaner assembly reduces the amount of residue in line with the shank path (row) and creates smaller clod sizes of soil in line with the shank swath, resulting in a better seedbed and faster warm up in the spring, enabling the planter to run in cleaner soil, preventing planter plugging and uneven seed planting depth as well as resulting in better seed-to soil-contact.

18 Claims, 4 Drawing Sheets

ROW CLEANER IN COMBINATION OF PRIMARY TILLAGE SHANK SYSTEM

CROSS REFERENCE TO RELATED APPLICATIONS

This application claims the benefit of copending U.S. Provisional Patent Application Serial No. 60/352,304, filed on Jan. 28, 2002. It is also related to U.S. patent application Ser. No. 10/340,432, filed simultaneously herewith and entitled "Rip Strip Primary Tillage System", and U.S. patent application Ser. No. 10/339,874, also filed simultaneously herewith, and entitled "Soil Surface Tillage Point in Combination of Primary Tillage Shank System".

BACKGROUND OF THE INVENTION

The present invention relates generally to an agricultural primary tillage implement, and more particularly to such an implement featuring a row cleaner assembly attached in front of the shank. As used herein, primary tillage means deep soil plowing, in an approximate range of 8 to 14-inches or greater. Secondary tillage may be in an approximate range of 3 to 6-inches.

Primary tillage is, of course, not in and of itself new, having started with the first plow to cut land. Improvements in tillage practices are generally slow to reach acceptance and almost always show themselves as small steps. Tillage implements providing both secondary and primary tillage in a single pass using disks and chisel points are also not generically new, as shown by U.S. Pat. Nos. 4,245,706; 4,403,662; and 4,538,689. These machines, however, do not create the best possible seedbed, i.e., do not create the soil conditions that best promote seed germination and plant growth.

During the late 1970's, before the machine shown in U.S. Pat. No. 4,403,662 became available, primary tillage was accomplished principally with moldboard plows. The moldboard plow leaves large slabs and chunks of soil that tend to break down during the freeze and thaw cycles of winter, but this type of plowing requires substantial working of the soil in the spring in order to level the field and prepare it for planting of the next crop. Moreover, moldboard plowing is not an effective remedy for soil erosion, and actually has a tendency to exacerbate this problem.

In recent years, farmers have recognized the long-term detrimental effects to the land characteristic of traditional farming techniques, and have been searching and experimenting for ways to decrease soil and wind erosion. The use of a large disk assembly in front of a chisel plow on a parabolic shank has gone a long way toward accomplishing these objectives and also breaks up the hard plow pan (or "sole") that is created at the particular depth at which the plow is set to operate, caused by repeated tillage at the same depth over the years. The parabolic shank and winged point do reduce soil erosion, but this practice also may create large chunks of soil, and usually requires substantial spring soil working to prepare an adequate seedbed for planting.

During the 1970's, the cutter chisel was widely used. It consisted of a chisel plow with a row of coulters to cut the residue ahead of two rows of staggered shanks, generally on thirty-inch centers. These shanks had a four-inch twisted point attached to perform the primary tillage. The tip of the point was at approximately a 45° angle to the horizontal, sloping downwardly and forwardly from the shank. The worked soil followed the curvature of the generally C-shaped shank that was attached to the chisel plow and was twisted in order to provide a moldboard-type turning action. A C-shaped shank, of the type described, is shown in U.S. Pat. No. 4,403,662.

For early cutter chisel plows, there was a net lateral movement of soil. A machine with, for example, eleven shanks would be equipped with five right-hand and six left-hand twisted points. The result was that a wide groove and a large berm were left after a pass. The machine as shown in U.S. Pat. No. 4,403,662 was an improvement because it left a smaller groove and not as large a berm by using fore-and-aft sets of disks and an improved point.

In U.S. Pat. No. 4,538,689, there is disclosed a winged point mounted on a parabolic shank. That winged point, in the combination shown, creates a large, rough surface similar to the surface of the moldboard plow used during the late 1970's and early 1980's. The wings on these points are set at a soil lift, twist and roll angle of approximately 30°. This lift angle was conventional at the time, but it is an aggressive angle that causes the wings to lift the soil abruptly. In some soils, particularly more compacted soils, the combination of an aggressive lift angle on the wings of the point, together with a parabolic shank, that is designed to lift and heave soil, lifted larger soil chunks and threw them out of the paths of the chisel plow and away from cooperating disks, making it difficult to create a level soil surface after a pass of the machine.

During the 1980's, researchers and farmers began to better understand the seedbed requirements for improved germination, emergence and growth. They also began to better understand the desirability of using less tillage to improve soil conservation and erosion prevention. The furrows left by the chisel shanks had to be filled with the berms that were created between each shank. In order to fill these furrows behind large parabolic shanks, smaller shanks were placed to run shallower and were located midway between the larger chisel shanks. This resulted in smaller grooves on reduced centers. With the development of the disk leveler shown in U.S. Pat. No. 5,080,178, the furrows behind the shanks were substantially filled without leaving sizeable grooves after the shanks had passed, thus improving the level or "smoothness" of the surface.

As today's farming operators are trying to combine multiple tillage operations into fewer passes, while maintaining or improving yields and reducing erosion, Crop Residue Management (CRM) has become a well-accepted practice. CRM is a year-round system beginning with the selection of crops that produce sufficient quantities of residue and may include the use of cover crops after low residue-producing crops. CRM includes all field operations that affect residue amounts, orientation and distribution throughout the seasonal period requiring protection. Tillage systems included, among others, under CRM are no-till, ridge-till, mulch-till and reduced-till. A change in tillage and planting operations to increase crop residues on the soil surface has been shown to produce crop yields generally equal to or higher than those produced by systems that leave little or no residue on the field after planting. However, more residue means fewer trips across the field, which translates to lower fuel bills, less soil compaction, and less wear and tear on equipment.

The objective of CRM is to accomplish the necessary primary tillage and prepare the best seedbed possible with a minimum number of equipment passes while maintaining a minimum disturbance of the crop residue. The present invention is an improvement that helps produce a better seedbed.

SUMMARY OF THE INVENTION

It is an object of the instant invention to provide an agricultural primary tillage implement that is designed to perform complete tillage of the soil in a single pass while leaving a raised-berm seedbed with reduced residue and smaller clod sizes of soil in line with the shank swath.

It is another object of the instant invention to provide an agricultural primary tillage implement that supports the Crop Residue Management approach to farming.

It is a further object of the instant invention to provide an agricultural primary tillage implement employing a row cleaner assembly in front of the shank.

It is a still further object of the instant invention to provide an agricultural primary tillage implement that prepares an improved seedbed.

It is an even still further object of the instant invention to provide an agricultural primary tillage implement that prepares a seedbed with better seed-to-soil contact and cleaner soil for the planter to run in, preventing planter plugging and uneven seed planting depth.

These and other objects are obtained by providing an agricultural primary tillage implement with a row cleaner assembly attached in front of the shank. That row cleaner is adjustable fore-and-aft for optimum clearance between the shank and a leading soil preparation apparatus to maximize clearance for residue movement. The row cleaner is also adjustable for depth. The row cleaner assembly reduces the amount of residue in line with the shank path (row) and creates smaller clod sizes of soil in line with the shank swath, resulting in a better seedbed and faster warm up in the spring, enabling the planter to run in cleaner soil, preventing planter plugging and uneven seed planting depth as well as resulting in better seed-to soil-contact.

DETAILED DESCRIPTION OF THE PREFERRED EMBODIMENT

Poor root development is a common yield limitation of no-till caused often by compacted soil with limited or poorly distributed pore spacing (to hold air and water). Proper pore size and distribution is critical for air and water exchange, which improves potential water infiltration and utilization—essential for healthy plant development.

The implement of the instant invention is comprised of several elements or apparatus, assembled in a unique combination, or system, to create an ideal field condition for growing plants. By shattering the compaction layer and reorienting the soil aggregates and residue, this system creates a healthier soil profile than similar machines of earlier design. The improved soil profile allows roots to expand into a greater volume of soil and obtain more nutrients, especially during the most critical times of the plant production cycle. Soil nutrient availability is foremost a function of good soil tilth. When the root zone has the ideal balance of minerals and organic matter and pore spacing, the plants thrive.

Slow seed germination and non-uniform plant stands, caused by seedbeds that are too cold, wet or dry, or poor seed-to-soil contact, are other common yield limitations in no-till farming. The implement to be described allows for quicker, more uniform stands that utilize sunlight, water and nutrients more effectively.

The preferred embodiment of the invention results in superior soil compaction relocation by shattering compaction, improved soil tilth, superior residue management and an ideal tilled strip ready for planting seed with no additional pass. This system solves the poor development yield limitations of no-till applications discussed above.

Figure 1:
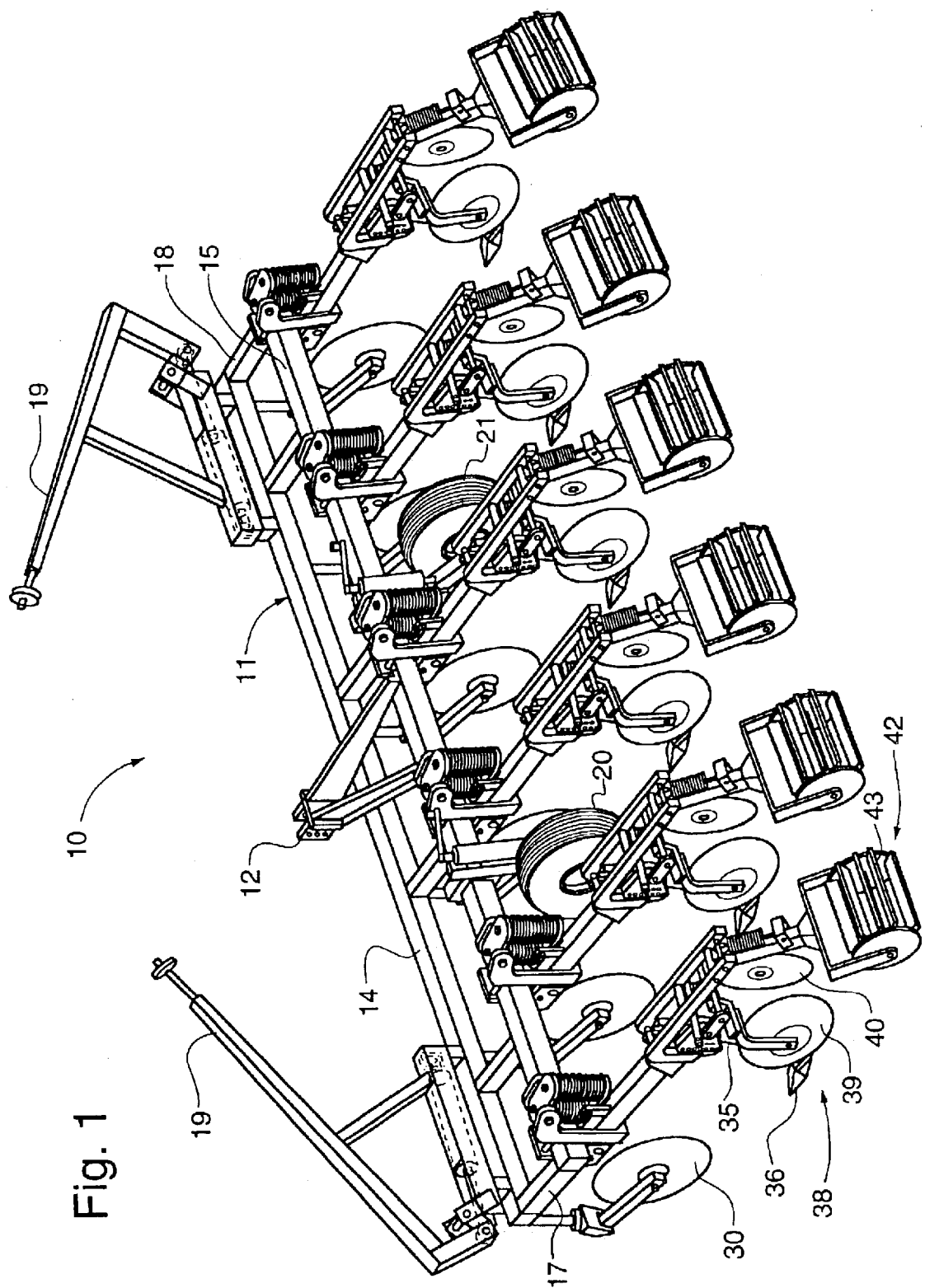
FIG. 1 is a top perspective view of a primary tillage implement of the type that would employ the row cleaner assembly of the instant invention.

Referring now to FIG. 1, reference numeral 10 generally designates an exemplary embodiment of the tillage implement including the row cleaner combination of the instant invention. Implement 10 includes a main frame generally designated 11 that is adapted to be attached at its front to the rear of an agricultural tractor by means of a conventional 3-point hitch 12. Larger main frames incorporate foldable toolbar wings for reduced transport widths. Frame 11 is a substantial structure intended to withstand significant operational forces and to maintain its integrity for many years of reliable service. Two generally parallel and coextensive elongate box beams, 14, 15 interconnected at the ends thereof by beams 17, 18 and by additional beams therebetween. Additionally, the structural support legs of hitch 12 are affixed to each of beams 14, 15 adding strength to the hitch and the main frame. Box beams 14, 15 serve not only as the primary structural members of the mains frame, but also as toolbars. The main frame may take other shapes and may be constructed of different materials and structural elements, the important result being a sound configuration to adequately support the various components of the implement to be further described below. This particular design, which in practice is made primarily of 4×6 or 6×6-inch box beams, allows for long life and durability, additional residue flow, and provides the weight necessary to penetrate the toughest soil conditions.

Frame 11 is supported for movement across a field or along a road by gauge wheels 20, 21 that may be of any known construction and design. Gauge wheels 20, 21 are each part of a unitized structure that includes a sturdy screw-adjustment for depth regulation, as well as pins to retain adjustment, all of which is attached to elongate frame member 14 or 15 by known clamping devices that allow the wheel units to be selectively placed along the length of frame member 15 as part of an adjustment of the spacing between seedbed strips. Depth indicators may also be added to make fine-tuning of depth penetration more convenient. Two such wheel units are shown in the drawings; however, depending upon the size and weight of the implement and the type of wheels used, more wheels may be appropriate. It is also possible that the particular configuration of elements, and the size and weight of the tractor being used, may benefit from the addition of lift-assist wheels, not shown in the drawings. Lift-assist wheels are known in the agricultural industry as add-on structure that minimizes hitch stress and helps the tractor's 3-point hitch lift implements, as well as safer tractor steering and stopping. Such units may include a stabilizing torque-tube to minimize wobble and ensure stable transport. Lift-assist wheels may also be adjustable for level field operation and optimum transport height.

Row markers 19 are shown in both figures. These are key to setting up or straightening existing rows. As is obvious from the drawings, these units are movable, usually hydraulically, between transport positions, as seen in the figures, and operational positions where they pivot outwardly to contact the soil, leaving a small visible furrow.

Raising or lowering the front of the main frame is accomplished by raising or lowering the 3-point hitch of the tractor. The 3-point hitch and the gauge wheels 20, 21, adjust the depth of penetration of the soil-engaging elements.

Implement 10 is comprised of a series of similar working units, each unit including a series of apparatus; in the configuration shown in FIG. 1 there are six such working units. For purposes of discussion these will be referred to as "working units" even though they are not necessarily unitized in construction, i.e., some parts of each working unit are attached separately to the main frame 11 rather than being assembled separately and attached to the frame as a unit. This is not to say that a unitized structure could not be used, but rather the preferred embodiment is not thus constructed. These working units come in various types, numbers and spacing to best fit the needs of the user.

Figure 2:
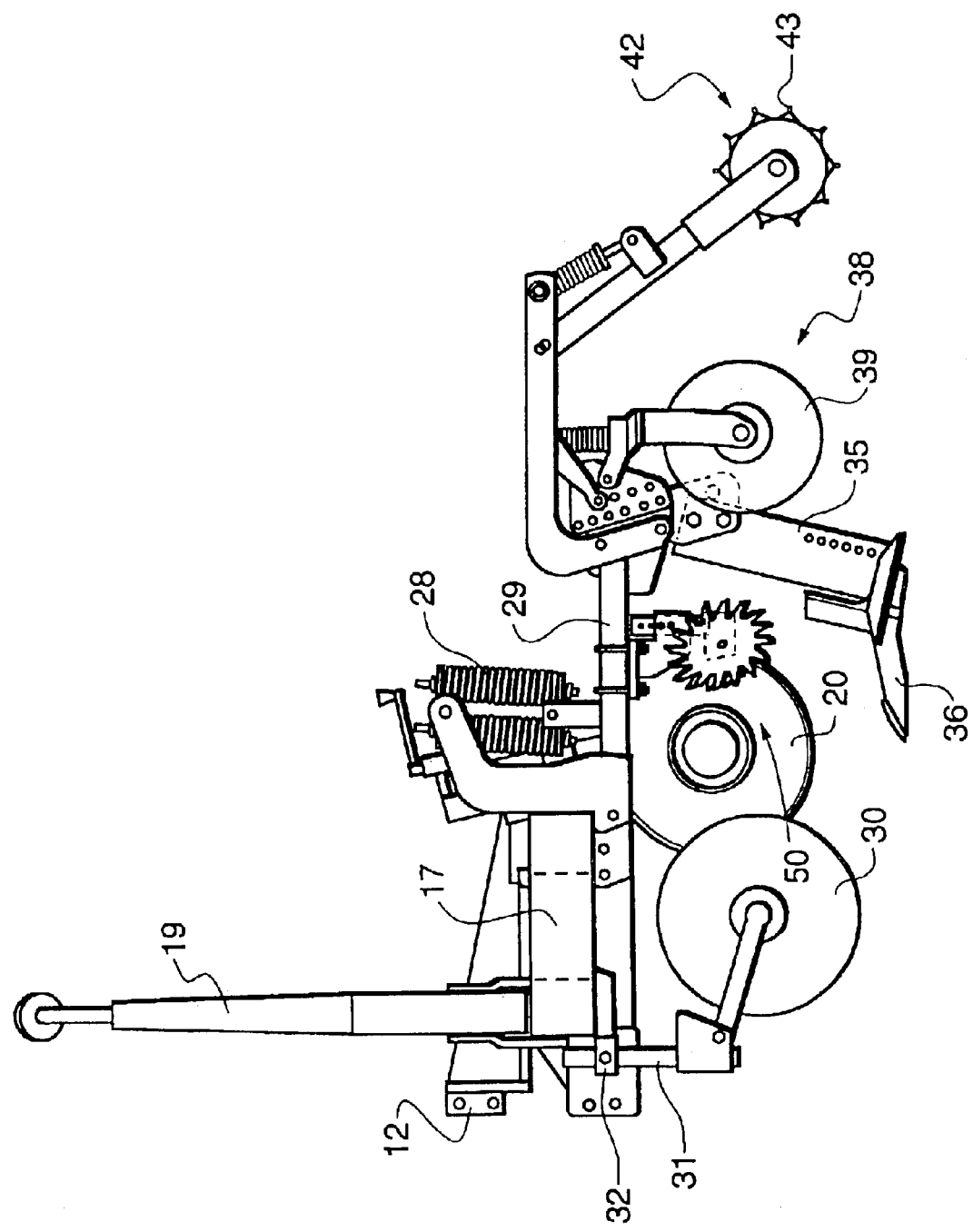
FIG. 2 is a side elevational view of the implement of FIG. 1.

As best seen in FIG. 2, rail 29 is pivotable relative to the main frame and has a shock-absorbing capability provided by springs 28. Longitudinal rail 29 is adjustably attached to frame member 15, similar to wheels 20, 21, with the various earth-working apparatus attached thereto. The first apparatus to engage the soil is a coulter 30 that cuts residue and loosens the soil ahead of the tillage shank generally without mixing the residue into the seedbed. Coulter 30 results in cutting and sizing residue and smaller clod sizes in the finished field. The depth of coulter 30 is adjustable by moving adjustment rod 31 upwardly or downwardly within clamp 32, and is moved to compensate for various settings of the tillage depth. General practice would be to use a coulter with a diameter of approximately 22-inches. The coulters may be either wavy or flat depending upon desired results and working conditions. A wavy coulter is best at reducing clod size and loosening surface soil. For in-row root cutting and less surface disruption, a flat coulter would be selected.

Second in the exemplary system to which the row cleaner assembly of the instant invention could be advantageously attached is a tillage shank 35 that is normally run at 8 to 14-inches deep. The shank itself should be either a no-till shank when uniform soil flow is required or a minimum disturbance shank for greater soil fracturing and maximum soil movement. Shank 35 has an attached tillage point 36, preferably either that shown in U.S. Pat. No. 6,276,462 or the no-till point shown in U.S. Pat. Nos. 4,538,689; 5,437,337; and 5,540,288. Either point runs in the compaction layer, fractures the layer and relocates the soil particles. Shank 35 is adjustable up and down to fine-tune the depth of penetration of the point 36.

Third in the exemplary system is a pair of gathering blades 38 that capture and gather the loose soil and residue together to create a berm of a mixture of soil and residue. This action fills in the groove left by shank 35 and gives ideal seed-to-soil contact for quick plant germination. As best seen in FIG. 1, blades 38 are comprised of two spaced-apart disc blades 39, 40 angled toward each other to move, or push, material into a berm. The blades are adjustable for depth, angle, and distance between blades to permit the operator to select the size of the berm. The blades shown are dull-edge disc blades; however, smooth sharp, smooth-dull, notched-sharp and notched-dull may also be selected depending upon the need for aggressive soil engagement.

The final apparatus of the exemplary system is a rotary reel 42 that conditions the strip of soil to give ideal seed-to-soil contact and uniform berm size, thus promoting early, fast and uniform emergence. Additionally, the rotary reel is available with round or flat bars 43, which control the amount of soil conditioning. Flat bar baskets reduce clod size and fluff, and are normally used in fall conditions. Round bar baskets do more firming, and are normally used in spring conditions. The rotary reels are also adjustable in height and down-pressure to control the amount of berm conditioning the soil receives.

Figure 3:
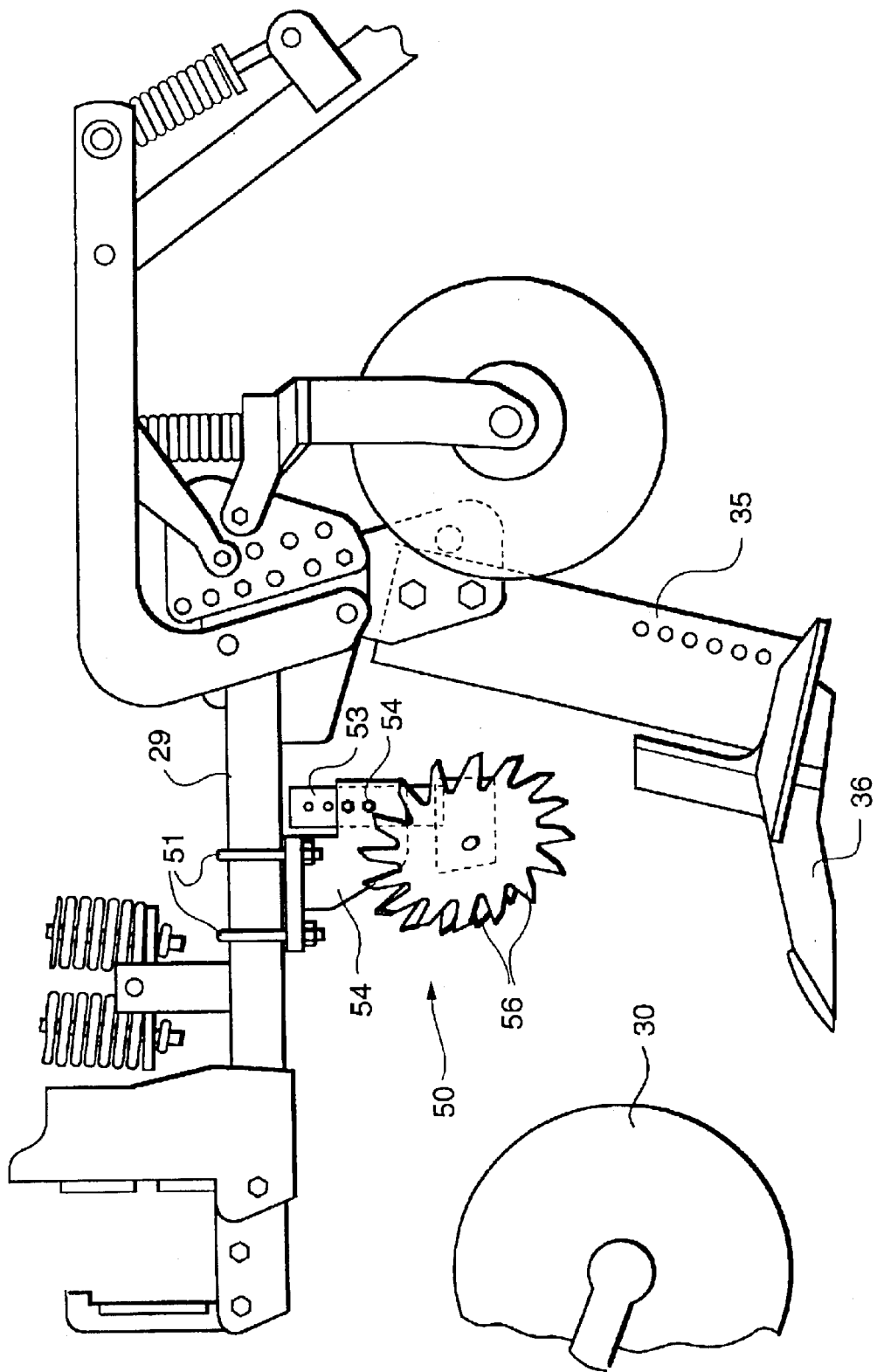
FIG. 3 is a partial side elevational view of the implement shown in FIG. 1 with the row cleaner assembly of the instant invention.
Figure 4:
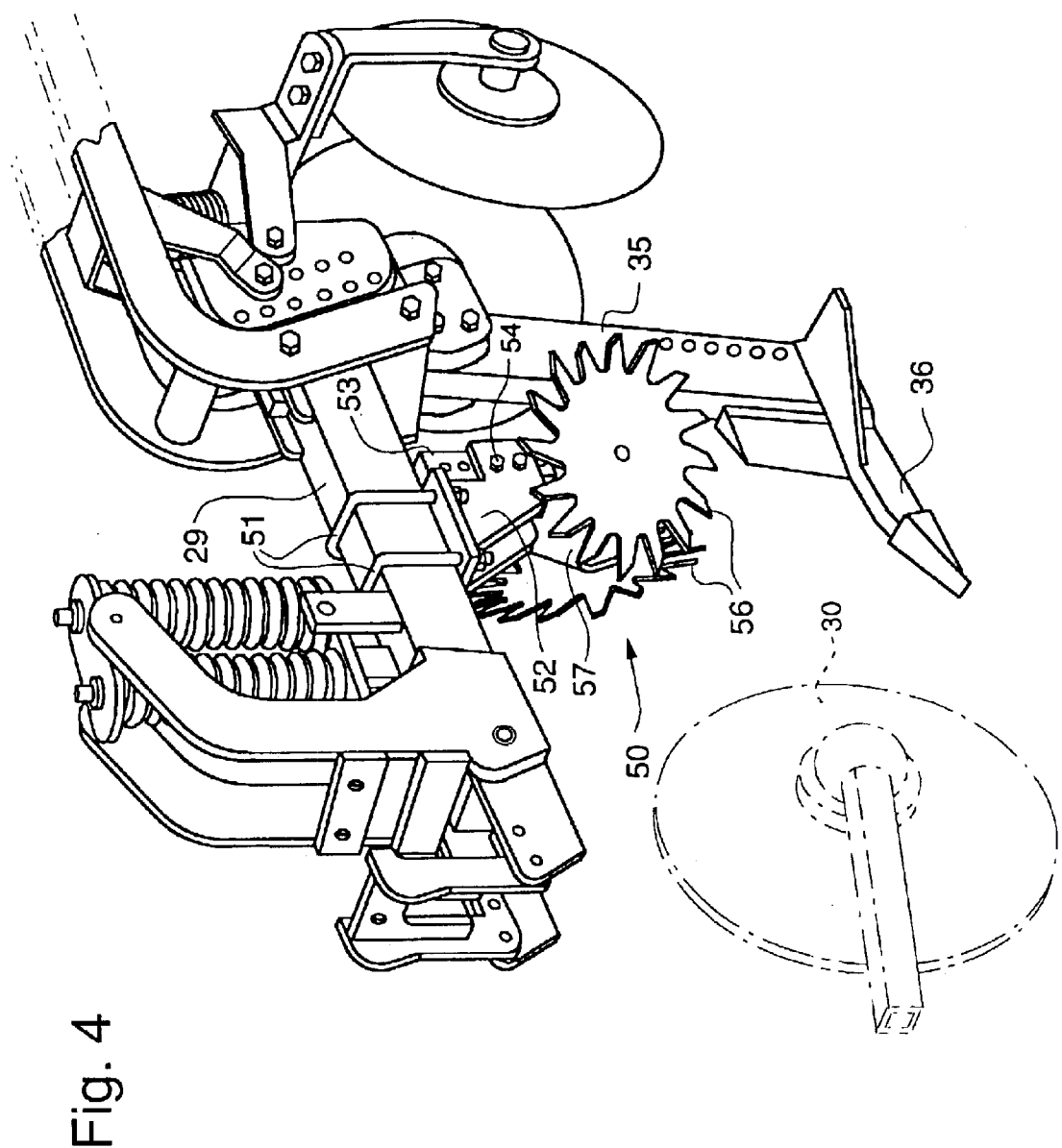
FIG. 4 is a front perspective view of FIG. 3.

Referring now to FIGS. 3 and 4, the row cleaner assembly 50 can be seen to comprise a clamp 51 adjustably affixed to rail 29 for selective placement along the open area thereof forward of shank 35 to adjust for varying amounts of residue so the machine does not build up residue between the tillage point and shank. A bracket 54 is rigidly attached to clamp 51 on one end and includes a female box bracket into which support member 53 slidingly extends. Member 53 slides up and down within the box bracket and can be selectively fixed at various locations by lock pins or bolts 54 to adjust the depth of the row cleaner blades 56. Row cleaner blades 56 are rotatably affixed to fixture 57 and are generally planar with equally spaced teeth spaced around the circumference thereof. Protection of the various components from obstructions is taken into consideration by the addition of shear bolts or other breakaway devices.

The purpose of the row cleaner assembly is to remove and part residue in front of the tillage shank path, reducing the amount of residue in the tilled shank path (row) and creating smaller clod sizes of soil in line with the shank path. This results in creation of a better seedbed and faster warm up of soil in the spring. Likewise, the action of the row cleaner enables the planter to run in a cleaner soil, preventing planter plugging and uneven seed planting depth. Additionally, the cleaning action results in a better seed-to-soil contact. Ultimately, this results in quicker seed germination and emergence. Another benefit of the row cleaner is to keep the residue from building up on the shank. This allows the shank to run cleaner and creates a mother, more uniform bed for the plant.

The row cleaner assembly attaches in front of the shank and is adjustable fore-and-aft for optimum clearance, in this exemplary system, between the first soil-engaging apparatus, in this case coulter 30, and the shank to maximize clearance for residue movement. Furthermore, the row cleaner assembly is adjustable for depth by removing lock pin 54 and moving the row cleaner assembly higher or lower relative to the shank point 36. The blades 56 do not work the soil, but are positioned slightly above the ground level to best engage and move residue. If the blades engage the soil, they throw valuable topsoil and pre-applied herbicides into the middle of the to where it is of no value. The blades can be of any diameter, but they are most effective if of sufficient size to properly engage varying depths of residue, in the range of 12 to 16-inches.

Many conventional elements or accessories known and used under normal circumstances have not be shown or discussed, but certainly would be employed under normal operating or transport conditions. For instance, this machine would normally have a jack stand attached near the forward end thereof to support the tongue when not connected to a tractor. Other items fitting this category are safety chains, SMV signs, warning lights, locking pins, disk scrapers, shear bolts, and the like.

Additionally, to be clear, there is any number of primary tillage implements known to which the row cleaner may be added to produce a unique agricultural implement with improved seedbed preparation characteristics. The apparatus shown here is merely one such implement available.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. For instance, as on of skill in this technology will readily understand, the turnbuckles shown and described may be replaced with hydraulic cylinders, operated and connected in a conventional manner, depending upon working conditions and operator preferences. Accordingly, the following claims are intended to protect the invention broadly as well as in the specific form shown.

Having thus described the invention, what is claimed is:

1. A primary tillage shank system comprising:
   a rigid main frame having a front end, an opposing rear end and opposing first and second sides extending therebetween;
   a hitch having one end connected to said main frame and an opposite forward end adapted to be connected to a vehicle for towing said tillage implement across a field;
   a plurality of similar working units supported by said main frame at generally equal intervals between said first and second sides, each said working unit having a working line along which it works the soil generally in a straight line such that each said working unit works the soil and prepares a seedbed in a strip, and together the said plurality of working units prepare a plurality of generally parallel continuous seedbeds in the direction of travel of said tillage system;
   wherein said working units each comprising a series of in-line working apparatus including, in a line generally along the respective said working line, a row cleaner to part the residue in front of the trailing tillage shank path, and a tillage shank to fracture and further loosen the soil,
   wherein said row cleaner comprises a pair of similar generally planar blades with elongated teeth spaced around the periphery thereof, said blades pivotally mounted on a fixture that holds said pair of blades angularly relative to the direction of travel of the tillage implement and to each other such that they generally form an arrowhead pointing in the direction of travel of the implement; and
   wherein said row cleaner is attached to an elongated fore-and-aft extending rail and adjustable there along to vary the distance between said row cleaner and said tillage shank, and adjustable relative to the soil such that is may be positioned to engage surface residue and move residue outwardly away from the path of said tillage shank.

2. The tillage implement of claim 1, further including, following said tillage shank as additional working apparatus:
   a pair of soil-gathering blades that capture and gather the loose soil and residue together and create a berm of a mixture of soil and residue, and a rotary reel that conditions the strip of soil to create a berm of uniform size.

3. The tillage implement of claim 2, wherein:
   said tillage shank has a tillage point attached to the lower end thereof, and said tillage shank is adjustable up and down to fine-tune the depth of penetration of said tillage point in the soil.

4. The tillage implement of claim 3, wherein:
   said tillage point is set up to run selectively in the range of 8 to 14-inches below soil surface.

5. The tillage implement of claim 4, wherein:
   said pair of soil-gathering blades are adjustable in depth, angle, and distance between blades to permit adjustment in the size of berm created by said pair of soil-gathering blades.

6. The tillage implement of claim 5, wherein:
   said rotary reel is adjustable in height above the surface of the berm and in the amount of down-pressure to control the amount of conditioning the soil making up the berm receives.

7. The tillage implement of claim 6, wherein:
   said rotary reel comprises flat bars.

8. The tillage implement of claim 6, wherein:
   said rotary reel comprises round bars.

9. In a primary tillage shank system having a wheeled main frame adapted to be towed through a field by a towing vehicle, said main frame having a front end, an opposing rear end and opposing first and second sides extending therebetween, the improvement comprising:
   a plurality of similar working units supported by said main frame at generally equal intervals between said first and second sides, each said working unit having a working line along which it works the soil generally in a straight line such that each said working unit works the soil and prepares a seedbed in a strip, and together the said plurality of working units prepare a plurality of generally parallel continuous seedbeds in the direction of travel of said tillage system;
   said working units each comprising a series of in-line working apparatus including, in a line generally along the respective said working line, a row cleaner to part the residue in front of the trailing tillage shank path, and a tillage shank to fracture and further loosen the soil
   wherein:
   said row cleaner comprises a pair of similar generally planar blades with elongated teeth spaced around the periphery thereof, said blades pivotally mounted on a fixture that holds said pair of blades angularly relative to the direction of travel of the tillage implement and to each other such that they generally form an arrowhead pointing in the direction of travel of the implement; and
   said row cleaner is attached to an elongated fore-and-aft extending rail and adjustable there along to vary the distance between said row cleaner and said tillage shank, and adjustable relative to the soil such that is may be positioned to engage surface residue and move residue outwardly away from the path of said tillage shank.

10. The tillage implement of claim 9, further including, following said tillage shank as additional working apparatus:
    a pair of soil-gathering blades that capture and gather the loose soil and residue together and create a berm of a mixture of soil and residue, and a rotary reel that conditions the strip of soil to create a berm of uniform size.

11. The tillage implement of claim 10, wherein:
    said tillage shank has a tillage point attached to the lower end thereof, and said tillage shank is adjustable up and down to fine-tune the depth of penetration of said tillage point in the soil.

12. The tillage implement of claim 11, wherein:
    said tillage point is set up to run selectively in the range of 8 to 14-inches below soil surface.

13. The tillage implement of claim 12, wherein:
    said pair of soil-gathering blades are adjustable in depth, angle, and distance between blades to permit adjustment in the size of berm created by said pair of soil-gathering blades.

14. The tillage implement of claim 13, wherein:

said rotary reel is adjustable in height above the surface of the berm and in the amount of down-pressure to control the amount of conditioning the soil making up the berm receives.

15. The tillage implement of claim 14, wherein:

said rotary reel comprises flat bars.

16. The tillage implement of claim 15, wherein:

said rotary reel comprises round bars.

17. A primary tillage shank system comprising:

a rigid main frame having a front end, an opposing rear end and opposing first and second sides extending therebetween;

a hitch having a rearward end connected to said main frame and an opposite forward end adapted to be connected to a tow vehicle operable to pull said tillage implement across a field;

a plurality of working units supported between said first and second sides of said main frame, each said working unit configured to work the soil and prepare a seedbed in a strip, wherein each said working unit includes:
  a for-and-aft extending rail; and
  a series of in-line working apparatus mounted on said fore-and-aft extending rail, the series of in-line working apparatus including a row cleaner to part the residue in front of a trailing tillage shank, wherein said row cleaner is selectively adjustable along said fore-and-aft extending rail so as to vary the distance between said row cleaner and said tillage shank.

18. In a primary tillage shank system having a wheeled main frame adapted to be pulled through a field by a tow vehicle, said main frame having a front end, an opposing rear end and opposing first and second sides extending therebetween, the improvement comprising:

a plurality of working units supported between said first and second sides of said main frame, each said working unit configured to work the soil and prepare a seedbed in a strip in the direction of travel of said primary tillage shank system, wherein each said working unit includes:
  an elongated fore-and-aft extending rail; and
  a series of in-line working apparatus mounted on said fore-and-aft extending rail, the series of in-line working apparatus including a row cleaner to part the residue in front of a trailing tillage shank, wherein said row cleaner is selectively adjustable along said elongated fore-and-aft extending rail so as to vary the distance between said row cleaner and said tillage shank, and wherein said row cleaner is adjustable relative to the soil such that said row cleaner may be positioned to engage surface residue and move residue outwardly away from a path of said tillage shank.

* * * * *